United States Patent
Kim et al.

(10) Patent No.: US 9,118,074 B2
(45) Date of Patent: Aug. 25, 2015

(54) ANODE ACTIVE MATERIAL, LITHIUM SECONDARY BATTERY EMPLOYING THE SAME, AND METHOD OF PREPARING THE ANODE ACTIVE MATERIAL

(71) Applicant: SAMSUNG SDI CO., LTD., Yongin-si, Gyeonggi-do (KR)

(72) Inventors: Jae-Hyuk Kim, Yongin-si (KR);
Young-Ugk Kim, Yongin-si (KR);
Seung-Uk Kwon, Yongin-si (KR);
Soon-Sung Suh, Yongin-si (KR);
Hee-Young Chu, Yongin-si (KR);
Duk-Hyoung Yoon, Yongin-si (KR);
Chang-Ui Jeong, Yongin-si (KR);
Yo-Han Park, Yongin-si (KR); Yury Matulevich, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 271 days.

(21) Appl. No.: 13/803,505

(22) Filed: Mar. 14, 2013

(65) Prior Publication Data
US 2014/0147750 A1    May 29, 2014

(30) Foreign Application Priority Data
Nov. 27, 2012    (KR) .................. 10-2012-0135562

(51) Int. Cl.
*H01M 4/134*    (2010.01)
*H01M 4/36*    (2006.01)
*H01M 4/38*    (2006.01)
*H01M 4/62*    (2006.01)
*H01M 4/587*    (2010.01)
*B22F 9/04*    (2006.01)

(52) U.S. Cl.
CPC .............. *H01M 4/386* (2013.01); *H01M 4/364* (2013.01); *H01M 4/587* (2013.01); *H01M 4/625* (2013.01); *B22F 2009/048* (2013.01); *H01M 4/622* (2013.01); *H01M 4/624* (2013.01)

(58) Field of Classification Search
None
See application file for complete search history.

(56) References Cited

FOREIGN PATENT DOCUMENTS

| JP | 2003-346793 A | 12/2003 |
|---|---|---|
| JP | 2004-335272 A | 11/2004 |
| KR | 1020100060613 A | 6/2010 |

OTHER PUBLICATIONS

Son et al., A Highly Reversible Nano-Si Anode Enabled by Mechanical Confinement in an Electrochemically Activated LixTi4Ni4Si7 Matrix, Advanced Energy Materail, 2012, pp. 1226-1231.

*Primary Examiner* — Cynthia K Walls
(74) *Attorney, Agent, or Firm* — Robert E. Bushnell, Esq.

(57) ABSTRACT

An anode active material, a lithium battery including the anode active material, and a method of preparing the anode active material are provided. The anode active material includes an alloy containing silicon (Si), titanium (Ti) and nickel (Ni) elements, wherein the alloy includes a Si phase and an alloy phase, and a peak intensity ratio ($I_{(111)}/I_{(220)}$) of Si(111) to Si(220) plane in a X-ray diffraction spectrum of the Si phase is from about 1.0 to about 1.5.

13 Claims, 6 Drawing Sheets

Preparing a parent alloy including silicon (Si), titanium (Ti), and nickel (Ni) elements Cooling the parent alloy to prepare an alloy ribbon including a Si phase and an alloy phase Milling the alloy ribbon to obtain alloy powder Thermally treating the alloy power to obtain the anode active material

ANODE ACTIVE MATERIAL, LITHIUM SECONDARY BATTERY EMPLOYING THE SAME, AND METHOD OF PREPARING THE ANODE ACTIVE MATERIAL

CLAIM OF PRIORITY

This application makes reference to, incorporates the same herein, and claims all benefits accruing under 35 U.S.C. §119 from an application for ANODE ACTIVE MATERIAL, LITHIUM SECONDARY BATTERY EMPLOYING THE SAME, AND METHOD OF PREPARING THE ANODE ACTIVE MATERIAL earlier filed in the Korean Intellectual Property Office on 27 Nov. 2012 and there duly assigned Serial No. 10-2012-0135562.

BACKGROUND OF THE INVENTION

1. Field of the Invention

One or more embodiments of the present invention relate to an anode active material, a lithium secondary battery including the anode active material, and a method of preparing the anode active material, and more particularly, to an anode active material that is improved in terms of cycle characteristics, initial efficiency, and discharge capacity, and a lithium secondary battery including the anode active material, and a method of preparing the anode active material.

2. Description of the Related Art

Lithium secondary batteries used in portable electronic devices for information communications, such as personal data assistants (PDAs), mobile phones, and laptop computers, electric bicycles, electric vehicles, and the like have a higher discharge voltage about twice or more as compared with existing batteries, and thus exhibit a high energy density.

Lithium batteries include a cathode and an anode, each including an active material that allows intercalation and deintercalation of lithium ions, and an organic electrolyte or a polymer electrolyte filling the gap between the anode and cathode. Lithium batteries produce electrical energy from redox reactions that take place as lithium ions are intercalated into or deintercalated from the cathode and anode.

Carbonaceous materials in various forms, such as artificial graphite, natural graphite and hard carbon, which allow intercalation and deintercalation of lithium ions, and non-carbonaceous materials such as high-capacity silicon (Si) have been studied for use as anode active materials of lithium secondary batteries.

However, non-carbonaceous materials such as Si may destabilize an anode structure as a result of repeated expansions and shrinkages during intercalation/intercalation of lithium ions, and thus may deteriorate cycle characteristics. To address these drawbacks, there has been research into Si-based alloy materials.

In general, Si-based alloy materials may consist of an active Si phase, and an inactive alloy phase serving as a matrix. The active Si phase includes Si crystal particles.

Si-based alloy materials have a structure in which a matrix structure, as a buffer layer for suppressing volumetric expansion of the Si crystal particles during charging/discharging of a lithium secondary battery, is surrounded by Si crystal particles. Furthermore, to improve cycle characteristics of the lithium secondary battery, there have been used methods of preparing a Si-based alloy material to have smaller Si crystal particles.

However, such preparation methods may likely cause residual stress in the Si-based alloy material during charging/discharging of the lithium secondary battery, and may not provide sufficient migration paths of Li ions coming from the cathode during charging of the lithium secondary battery or allow accommodation of Li ions.

Therefore, there still is a need for the development of an anode active material with improved cycle characteristics, initial efficiency and discharge capacity, a lithium battery including the anode active material, and a method of preparing the anode active material.

SUMMARY OF THE INVENTION

One or more embodiments of the present invention include an anode active material that is improved in terms of cycle characteristics, initial efficiency, and discharge capacity of a lithium battery.

One or more embodiments of the present invention include a lithium secondary battery with improved cycle characteristics, initial efficiency and discharge capacity.

One or more embodiments of the present invention include a method of preparing the anode active material that is improved in terms of cycle characteristics, initial efficiency, and discharge capacity of a lithium battery.

Additional aspects will be set forth in part in the description which follows and, in part, will be apparent from the description, or may be learned by practice of the presented embodiments.

According to one or more embodiments of the present invention, an anode active material includes an alloy containing silicon (Si), titanium (Ti) and nickel (Ni) elements, wherein the alloy includes a Si phase and an alloy phase, and a peak intensity ratio $(I_{(111)}/I_{(220)})$ of Si(111) to Si(220) plane in a X-ray diffraction spectrum of the Si phase is from about 1.0 to about 1.5.

The Si phase may include Si crystal particles, and the Si crystal particles may have a particle diameter of from about 30 nm to about 40 nm.

The alloy phase may include a $NiSi_2$ phase or a $Si_7Ti_4Ni_4$ phase.

An X-ray diffraction spectrum of the $Si_7Ti_4Ni_4$ phase at a CuK-α X-ray wavelength of 1.541 Å may include a primary peak at a Bragg angle 2θ of about 43.1°±0.1°, and a secondary peak at a Bragg angle 2θ of about 40.5°±0.1°.

A primary to secondary peak intensity ratio $I_{(primary\ peak)}/I_{(secondary\ peak)}$ of the $Si_7Ti_4N_4$ phase at the Bragg angles 2θ in the X-ray diffraction spectrum may be about 1.1 or greater.

The alloy may have a composition represented by Formula 1 below:

$$Si_x\text{—}Ti_y\text{—}Ni_z \qquad \text{<Formula 1>}$$

wherein, in Formula 1, x/(x+y+z) is from about 0.5 to about 0.8; y/(x+y+z) is from about 0.1 to about 0.25; and z/(x+y+z) is from about 0.1 to about 0.25.

The alloy may be in powder form having an average particle diameter (D50) of from about 1 μm to about 10 μm.

The anode active material may further include a carbonaceous material.

According to one or more embodiments of the present invention, a lithium secondary battery includes: a cathode; an anode including the above-described anode active material; and an electrolyte disposed between the cathode and the anode.

According to one or more embodiments of the present invention, a method of preparing an anode active material includes: preparing a parent alloy including silicon (Si), titanium (Ti), and nickel (Ni) elements; cooling the parent alloy to prepare an alloy ribbon including a Si phase and an alloy phase; milling the alloy ribbon to obtain alloy powder; and thermally treating the alloy power to obtain the anode active material having a peak intensity ratio ($I_{(111)}/I_{(220)}$) of Si(111) to Si(220) plane in a X-ray diffraction spectrum of the Si phase ranging from about 1.0 to about 1.5.

The preparing of the alloy ribbon may include rapidly cooling the parent alloy at a speed of from about $10^3$ K/sec to about $10^7$ K/sec.

The rapid cooling may be performed using melt spinning or gas automization.

The thermal treating may be conducted at a temperature of from about 500° C. to about 700° C. in a nitrogen gas atmosphere, a hydrogen gas atmosphere, or a nitrogen-hydrogen mixed gas atmosphere.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
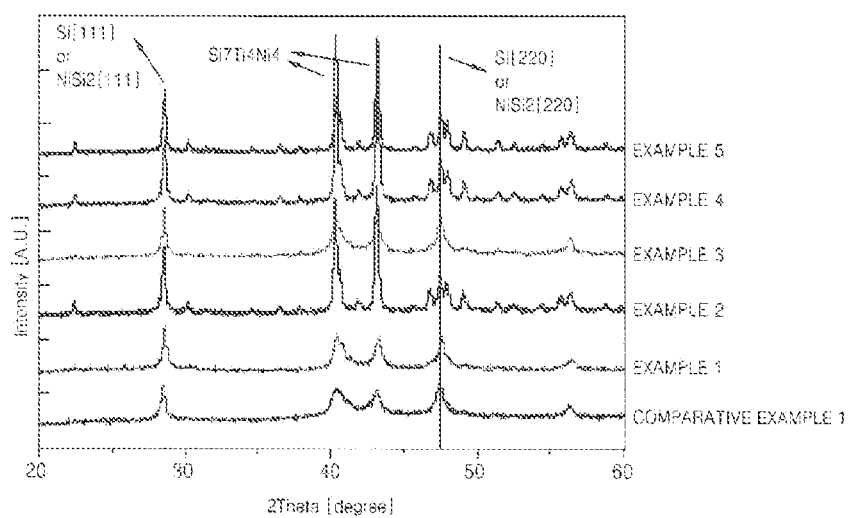
FIG. 1 is a graph illustrating X-ray diffraction (XRD) analysis results for anode active materials of Examples 1 to 5 and Comparative Example 1.

Reference will now be made in detail to embodiments of an anode active material, a lithium secondary battery including the anode active material, and a method of preparing the anode active material, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an embodiment of the present invention, an anode active material includes an alloy containing silicon (Si), titanium (Ti) and nickel (Ni) elements, wherein the alloy includes a Si phase and an alloy phase, and a peak intensity ratio ($I_{(111)}/I_{(220)}$) of Si(111) to Si(220) plane in a X-ray diffraction spectrum of the Si phase is from about 1.0 to about 1.5.

In some embodiments, the peak intensity ratio ($I_{(111)}/I_{(220)}$) of Si(111) to Si(220) plane in the X-ray diffraction spectrum of the Si phase may be from about 1.1 to about 1.5.

When the peak intensity ratio ($I_{(111)}/I_{(220)}$) of Si(111) to Si(220) plane in the X-ray diffraction spectrum of the Si phase included in the anode active material is within these ranges, the Si phase in the alloy including Si, Ti, and Ni elements may be active as orderly crystal phase to generate sufficient migration paths of Li ions generated during charging of a lithium secondary battery and to allow intercalation/deintercalation of sufficient Li ions during charging/discharging of the lithium secondary battery.

Accordingly, a lithium secondary battery including the anode active material may be improved in terms of initial efficiency, discharge capacity, and further in cycle characteristics.

The Si phase may include Si crystal particles. The Si crystal particles may have a particle diameter of from about 30 nm to about 40 nm, and in some embodiments, from about 31 nm to about 39 nm. The particle diameter of the Si crystal particles may be calculated using a full width at half maximum (HWHM) obtained from peaks of the Si(111) plane of the Si phase, and the Scherrer's equation.

When the particle diameter of the Si crystal particles is uniform within these ranges, irreversible capacity may be reduced due to smaller specific surface area, and intercalation/deintercalation of appropriate Li ions may be ensured during charging/discharging of the lithium secondary battery, leading to improved cycle characteristics even with repeated volumetric expansions/shrinkages of the Si crystal particles.

The alloy phase may include a $NiSi_2$ phase or a $Si_7Ti_4Ni_4$ phase.

The $Si_7Ti_4Ni_4$ phase may form a matrix.

Of the alloy phases of the anode active material, the $Si_7Ti_4Ni_4$ phase may form a matrix and serve as a buffer layer to relieve sudden volumetric expansions/shrinkages of the Si crystal particles that contribute to the charge/discharge capacity of a lithium secondary battery.

Therefore, the anode active material may have improved initial efficiency, discharge capacity, and lifetime characteristics of a lithium secondary battery.

An X-ray diffraction spectrum of the $Si_7Ti_4Ni_4$ phase at a CuK-α X-ray wavelength of 1.541 Å may exhibit a main peak at a Bragg angle 2θ of about 43.1°±0.1°, and a minor peak at a Bragg angle 2θ of about 40.5°±0.1°, which is shown in FIG. 1, which will be described later.

A primary to secondary peak intensity ratio $I_{(primary\ peak)}/I_{(secondary\ peak)}$ of the $Si_7Ti_4N_4$ at the Bragg angles 2θ in the X-ray spectrum may be about 1.1 or greater, and in some embodiments, may be from about 1.1 to about 2.5.

That is, the $Si_7Ti_4N_4$ phase serving as a matrix in the anode active material may have a high crystallinity.

The alloy of the anode active material may have a composition represented by Formula 1 below:

$$Si_x—Ti_y—Ni_z \qquad \text{<Formula 1>}$$

In Formula 1, x/(x+y+z) may be from about 0.5 to about 0.8; y/(x+y+z) may be from about 0.1 to 0.25; and z/(x+y+z) may be from about 0.1 to about 0.25.

A Si content in the alloy may be from about 50 to about 80 atomic %, and in some embodiments, may be from about 60 to about 70 atomic %.

A Ti content in the alloy may be from about 10 to about 25 atomic %, and a Ni content in the alloy may be from about 10 to about 25 atomic %. In some other embodiments, the Ti content in the alloy may be from about 15 to 20 atomic %, and the Ni content in the alloy may be from about 15 to 20 atomic %.

When the composition and the content of the alloy of the anode active material including Si, Ni, and Ti elements is within these ranges, the anode active material may have improved cycle characteristics.

The alloy may be in powder form having an average particle diameter (D50) of from about 1 μgym to about 10 μgym, and in some embodiments, having a D50 of from about 3 μgym to about 8 μm. The particle sizes of the alloy may be identified from, for example, FIG. 2, which will be described later.

The anode active material may further include a carbonaceous material. In some embodiments, an amount of the carbonaceous material may be from about 1 to about 99.99 parts by weight based on 100 parts by weight of the anode active material. The carbonaceous material may include either a crystalline carbonaceous material or an amorphous carbonaceous material.

When the anode active material further comprises the carbonaceous material, intercalation/deintercalation of Li ions may be facilitated, and a lithium secondary battery including the anode active material may have further improved initial efficiency, discharge capacity and cycle characteristics.

According to another embodiment of the present invention, a lithium secondary battery includes a cathode, an anode including the above-described anode active material, and an electrolyte disposed between the cathode and the anode. The lithium secondary battery may be improved in initial efficiency and discharge capacity, and further in cycle characteristics.

The cathode may be manufactured as follows.

First, a cathode active material, a conducting agent, a binder, and a solvent are mixed to prepare a cathode active material composition. The cathode active material composition is directly coated on an aluminum current collector and dried to form a cathode active film on a cathode plate. Alternatively, the cathode active material composition may be cast on a separate support to form a cathode active material film, which is then separated from the support and laminated on an aluminum current collector to prepare a cathode plate with the cathode active material film.

The cathode active material may be any material that is available for cathodes and is able to intercalate and detercalate lithium ions. Non-limiting examples of the cathode active material are compounds represented by the following formulae.

$Li_aA_{1-b}X_bD_2$ (where $0.95 \leq a \leq 1.1$, and $0 \leq b \leq 0.5$); $Li_aE_{1-b}X_bO_{2-c}D_c$ (where $0.95 \leq a \leq 1.1$, $0 \leq b \leq 0.5$, and $0 \leq c \leq 0.05$); $LiE_{2-b}X_bO_{4-c}D_c$ (where $0 \leq b \leq 0.5$, and $0 \leq c \leq 0.05$); $Li_aNi_{1-b-c}Co_bB_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Co_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Co_bX_cO_{2-\alpha}M_2$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cD_\alpha$ (where $0.95 \leq a \leq 1.1$, $0 \leq b \leq 0.5$, $0 \leq c \leq 0.05$, and $0 < \alpha \leq 2$); $Li_aNi_{1-b-c}Mn_bX_cO_{2-\alpha}M_\alpha$ (where $0.95 \leq a \leq 1.1$, $0 \leq b \leq 0.5$, $0 \leq c \leq 0.05$, and $0 < \alpha < 2$); $Li_aNi_{1-b-c}Mn_bX_cO_{2-\alpha}M_2$ (where $0.95 \leq a \leq 1.1$, $0 \leq b \leq 0.5$, $0 \leq c \leq 0.05$, and $0 < \alpha < 2$); $Li_aNi_bE_cG_dO_2$ (where $0.90 \leq a \leq 1.1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.1$, $0 \leq b \leq 0.9$, $0 \leq c \leq 0.5$, $0 \leq d \leq 0.5$, and $0 \leq e \leq 0.1$); $Li_aNiG_bO_2$ (where $0.90 \leq a \leq 1.1$, and $0.001 \leq b \leq 0.1$); $Li_aCoG_bO_2$ (where $0.90 \leq a \leq 1.1$, and $0.001 \leq b \leq 0.1$); $Li_aMnG_bO_2$ (where $0.90 \leq a \leq 1.1$, and $0.001 \leq b \leq 0.1$); $Li_aMn_2G_bO_4$ (where $0.90 \leq a \leq 1.1$, and $0 \leq b \leq 0.1$); $LiQO_2$; $LiQS_2$; $LiV_2O_5$; $LiZO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); $LiFePO_4$; and lithium titanate.

In the above formulae, A is selected from the group consisting of nickel (Ni), cobalt (Co), manganese (Mn), and combinations thereof; X is selected from the group consisting of aluminum (Al), nickel (Ni), cobalt (Co), manganese (Mn), chromium (Cr), iron (Fe), magnesium (Mg), strontium (Sr), vanadium (V), a rare earth element, and combinations thereof; D is selected from the group consisting of oxygen (O), fluorine (F), sulfur (S), phosphorus (P), and combinations thereof; E is selected from the group consisting of cobalt (Co), manganese (Mn), and combinations thereof; M is selected from the group consisting of fluorine (F), sulfur (S), phosphorus (P), and combinations thereof; G is selected from the group consisting of aluminum (Al), chromium (Cr), manganese (Mn), iron (Fe), magnesium (Mg), lanthanum (La), cerium (Ce), strontium (Sr), vanadium (V), and combinations thereof; Q is selected from the group consisting of titanium (Ti), molybdenum (Mo), manganese (Mn), and combinations thereof; Z is selected from the group consisting of chromium (Cr), vanadium (V), iron (Fe), scandium (Sc), yttrium (Y), and combinations thereof; and J is selected from the group consisting of vanadium (V), chromium (Cr), manganese (Mn), cobalt (Co), nickel (Ni), copper (Cu), and combinations thereof. For example, the cathode active material may be a lithium titanate.

Examples of the lithium titanate are spinel-structured lithium titanate, anatase-structured lithium titanate, and ramsdellite-structured lithium titanate, which are classified according to their crystal structures.

Non-limiting examples of the conducting agent are carbon black, graphite particulates, natural graphite, artificial graphite, acetylene black, ketjen black, carbon fibers, carbon nanotube, metallic materials, such as copper, nickel, aluminum, silver, and the like, in powder, fiber, or tube form, and a conductive polymer such as polyphenylene derivatives. Any conducting agent available in the art may be used.

Non-limiting examples of the binder are a vinylidene fluoride/hexafluoropropylene copolymer, polyvinylidene fluoride (PVDF), polyacrylonitrile, polymethylmethacrylate, polytetrafluoroethylene, mixtures thereof, and a styrene butadiene rubber polymer. Non-limiting examples of the solvent are N-methyl-pyrrolidone (NMP), acetone, and water. Any material available for these purposes in the art may be used. The amounts of the cathode active material, the conducting agent, the binder, and the solvent used in the manufacture of the lithium battery are those levels that are generally used in the art.

The anode may be manufactured in the same manner as the cathode, except for using an anode active material, instead of the cathode active material.

The anode may be manufactured as follows.

Next, similarly to the manufacturing of the cathode as described above, an anode active material, a conducting agent, a binder, and a solvent are mixed to prepare an anode active material composition. The anode active material composition is directly coated on a copper current collector to prepare an anode plate. Alternatively, the anode active material composition may be cast on a separate support, and then an anode active material film separated from the support may be laminated on a copper current collector to prepare an anode plate.

The anode active material may further include a conventional anode active material, in addition to the above-described anode active materials. Examples of the anode active material are a lithium metal, a transition metal oxide, and the like.

Non-limiting examples of the transition metal oxide are vanadium oxide, lithium vanadium oxide, and the like. Examples of the material that allows doping or undoping of lithium are silicon (Si), $SiO_x$ wherein $0 < x < 2$, an Si—Y alloy wherein Y is an alkali metal, an alkali earth metal, a Group XIII to XVI element, a transition metal, a rare earth element, or combinations thereof (except for Si), Sn, $SnO_2$, an Sn—Y alloy wherein Y is an alkali metal, an alkali earth metal, a Group XIII to XVI element, a transition metal, a rare earth element, or a combination thereof (except for Sn), and combinations of at least one of these materials and $SiO_2$. Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or combinations thereof.

The conducting agent, the binder, and the solvent in the anode active material composition may be the same as those used in the cathode active material composition. If required, a plasticizer may be added to each of the cathode active material composition and the anode active material composition to form pores in the electrode plates.

The amounts of the anode active material, the conducting agent, the binder, and the solvent may be those levels that are generally used in the manufacture of lithium batteries in the art. At least one of the conducting agent, the binder and the solvent may not be used according to the use and the structure of the lithium secondary battery.

Next, a separator to be disposed between the cathode and the anode is prepared. The separator for the lithium battery may be any separator that is commonly used in lithium batteries. The separator may have low resistance to migration of ions in an electrolyte and have an excellent electrolyte-retaining ability. Examples of the separator are glass fiber, polyester, Teflon, polyethylene, polypropylene, polytetrafluoroethylene (PTFE), and a combination thereof, each of which may be a non-woven or woven fabric. For example, a rollable separator including polyethylene or polypropylene may be used for a lithium ion battery. A separator with good organic electrolyte solution retaining capability may be used for a lithium ion polymer battery. For example, the separator may be manufactured in the following manner.

A polymer resin, a filler, and a solvent may be mixed together to prepare a separator composition. Then, the separator composition may be directly coated on an electrode, and then dried to form the separator. Alternatively, the separator composition may be cast on a support and then dried to form a separator film, which may then be separated from the support and laminated on an electrode to form the separator.

The polymer resin used to manufacture the separator may be any material that is commonly used as a binder for electrode plates. Examples of the polymer resin are a vinylidenefluoride/hexafluoropropylene copolymer, polyvinylidene fluoride (PVDF), polyacrylonitrile, polymethylmethacrylate and a mixture thereof.

Next, an electrolyte is prepared.

For example, the electrolyte may be an organic electrolyte solution. Alternately, the electrolyte may be in a solid phase. Non-limiting examples of the electrolyte are boron oxide and lithium oxynitride. Any material available as a solid electrolyte in the art may be used. The solid electrolyte may be formed on the anode by, for example, sputtering.

In some embodiments, an organic electrolyte solution may be prepared as follows. The organic electrolyte solution may be prepared by dissolving a lithium salt in an organic solvent.

The organic solvent may be any solvent available as an organic solvent in the art. Examples of the organic solvent are propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulforane, dichloroethane, chlorobenzene, nitrobenzene, diethylene glycol, dimethyl ether, and mixtures thereof.

The lithium salt may be any material available as a lithium salt in the art. Non-limiting examples of the lithium salt are $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, or a mixture thereof.

Figure 3:
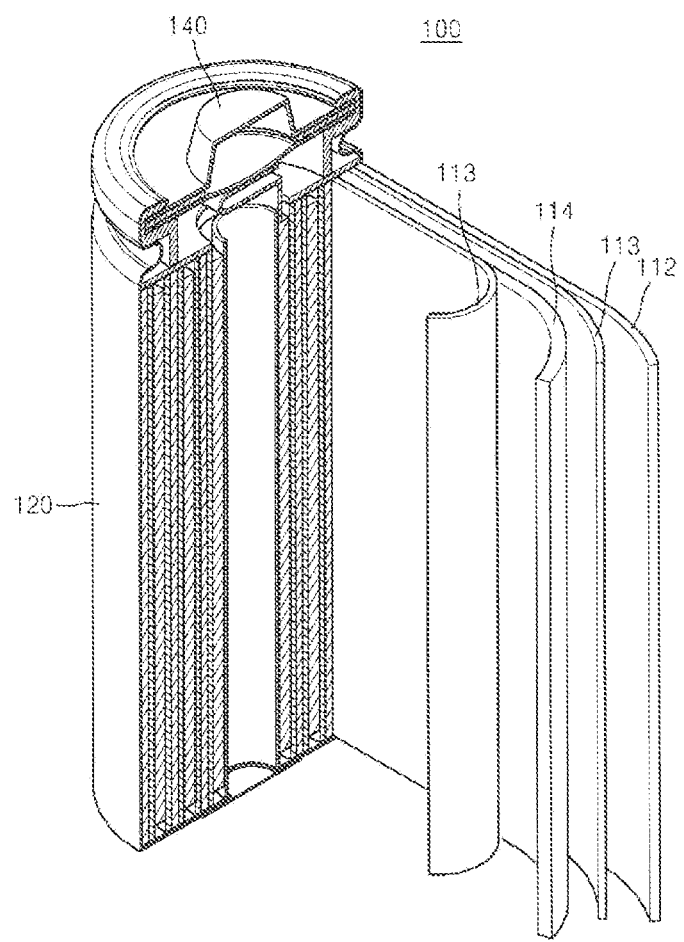
FIG. 3 is an exploded perspective view of a lithium battery according to an embodiment of the present invention.

Referring to FIG. 3, a lithium battery 100 includes a cathode 114, an anode 112, and a separator 113. The cathode 114, the anode 112, and the separator 113 are wound or folded, and then accommodated in a battery case 120. Subsequently, an organic electrolyte is injected into the battery case 120, and the battery case 25 is then sealed by a sealing member 140, thereby completing the manufacture of the lithium battery 100. The battery case 25 may be a cylindrical type, a rectangular type, or a thin-film type. For example, the lithium battery 100 may be a large-size thin film battery. The lithium battery 100 may be a lithium ion battery.

The separator may be interposed between the cathode and the anode to form a battery assembly. Alternatively, the battery assembly may be stacked in a bi-cell structure and impregnated with the electrolyte solution. The resultant is put into a pouch and hermetically sealed, thereby completing the manufacture of a lithium ion polymer battery.

Alternatively, a plurality of battery assemblies may be stacked to form a battery pack, which may be used in any device that operates at high temperatures and requires high capacity and high output, for example, in a laptop computer, a smart phone, electric vehicle, and the like.

According to another embodiment of the present invention, a method of preparing an anode active material includes preparing a parent alloy including silicon (Si), titanium (Ti), and nickel (Ni) elements; cooling the parent alloy to prepare an alloy ribbon including a Si phase and an alloy phase; milling the alloy ribbon to obtain alloy powder; and thermally treating the alloy power to obtain the anode active material having a peak intensity ratio $(I_{(111)}/I_{(220)})$ of Si(111) to Si(220) plane in a X-ray diffraction spectrum of the Si phase ranging from about 1.0 to about 1.5.

In the method of preparing an anode active material, first a parent alloy including Si, Ti, and Ni elements is prepared.

The parent alloy may have a composition represented by Formula 1 below:

$$Si_x\text{—}Ti_y\text{—}Ni_z \qquad \text{<Formula 1>}$$

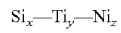

In Formula 1, x/(x+y+z) may be from about 0.5 to about 0.8; y/(x+y+z) may be from about 0.1 to about 0.25; and z/(x+y+z) may be from about 0.1 to about 0.25.

A Si content in the alloy may be from about 50 to about 80 atomic %, and in some embodiments, may be from about 60 to about 70 atomic %.

A Ti content in the alloy may be from about 10 to about 25 atomic %, and a Ni content in the alloy may be from about 10 to about 25 atomic %. In some other embodiments, the Ti content in the alloy may be from about 15 to 20 atomic %, and the Ni content in the alloy may be from about 15 to 20 atomic %.

When the composition and the content of the alloy of the anode active material including Si, Ni, and Ti elements is within these ranges, the anode active material may have improved cycle characteristics.

The preparing of the parent alloy may be conducted using vacuum induction melting, arc melting, or mechanical alloying. For example, the parent alloy may be prepared using vacuum induction melting of dissolving the parent alloy under vacuum to prevent oxidation caused by air. The parent alloy may be prepared using any of a variety of methods, not limited to these methods, for preparing a parent alloy available in the art.

Next, the parent alloy is cooled to prepare an alloy ribbon including a Si phase and an alloy phase.

The preparing of the alloy ribbon may include rapidly cooling the parent alloy at a rate of from about $10^3$ K/sec to about $10^7$ K/sec, and in some embodiments, at a rate of from about $10^5$ K/sec to about $10^7$ K/sec. When the rapid cooling of the parent alloy is performed within these speed ranges, the alloy ribbon may include suitable, uniformly distributed Si and alloy phases.

The rapid cooling of the parent alloy may be conducted using melt spinning or gas atomization. For example, the rapid cooling may be conducted using melt spinning. In some embodiments, the rapid cooling of the parent alloy may be conducted using single-roll melt spinning that involves spraying molten alloy on a single rotating roll, twin roll melt spinning that involves spraying molten alloy on two rotating rollers, gas-water atomization that involve spraying molten alloy into water, or centrifugal automization that involves melting and evaporating a rotating material formed from an alloy electrode by spark discharging, and rapidly cooling to solidify the resulting product, or the like.

Subsequently, the alloy ribbon is milled to obtain alloy powder. The milling of the alloy ribbon may be performed using mechanical milling, for example, ball milling.

The alloy powder may have an average particle diameter (D50) of from about 1 µm to about 10 µm, and in some embodiments, from about 3 µm to about 8 µm. The average particle diameters of the alloy powder may be identified from FIG. 2, which will be described later.

Next, the alloy powder is thermally treated to obtain an anode active material having a peak intensity ratio ($I_{(111)}/I_{(220)}$) of Si(111) to Si(220) plane in a X-ray diffraction spectrum of the Si phase ranging from about 1.0 to about 1.5.

The thermal treating may be conducted at a temperature of from about 500° C. to about 700° C. in a nitrogen gas atmosphere, a hydrogen gas atmosphere, or a nitrogen-hydrogen mixed gas atmosphere. The thermal treatment time may be from about 0.5 to about 15 hours, and in some embodiments, from about 1 to 10 hours.

When rapidly cooling the parent alloy to prepare an alloy ribbon including Si and alloy phases, solidification of the molten metal may occur in a thermodynamically unstable condition. This may cause residual stress in the anode active material. Accordingly, a lithium secondary battery including the anode active material may have reduced initial efficiency and discharge capacity, and reduced cycle characteristics due to non-uniform particle diameters of the Si crystals.

When the thermal treating is performed within the above-defined temperature range in a nitrogen gas atmosphere, a hydrogen gas atmosphere, or a nitrogen-hydrogen mixed gas atmosphere, the anode active material may be improved in terms of initial efficiency, discharge capacity, and cycle characteristics because the Si phase in the alloy including Si, Ti, and Ni elements has more orderly crystal phase.

The anode active material obtained through the thermal treating may have a peak intensity ratio ($I_{(111)}/I_{(220)}$) of Si(111) to Si(220) plane in the X-ray diffraction spectrum of the Si phase ranging from about 1.1 to about 1.5.

The Si phase of the anode active material obtained through the thermal treating may include Si crystal particles, and the Si crystal particles may have a particle diameter of from about 30 nm to about 40 nm, and in some embodiments, from about 31 nm to about 39 nm. The particle diameter of the Si crystal particles may obtain a full width at half maximum (HWHM) obtained from peaks of the Si(111) plane of the Si phase and be calculated using the Scherrer's equation.

When the particle diameter of the Si crystal particles is uniform within these ranges, irreversible capacity may be reduced due to smaller specific surface area, and intercalation/deintercalation of appropriate Li ions may be ensured during charging/discharging of the lithium secondary battery, leading to improved cycle characteristics even with repeated volumetric expansions/shrinkages of the Si crystal particles.

Hereinafter, one or more embodiments of the present invention will be described in further detail with reference to the following examples. These examples are not intended to limit the purpose and scope of the one or more embodiments of the present invention.

EXAMPLES

Preparation of Anode Active Material

Example 1

Si, Ti, and Ni were mixed together in a ratio of 65:17.5:17.5 by atomic % (at %) to obtain a mixture, which was then melted in an induction melting furnace in a vacuum to prepare a parent alloy of Si, Ti, and Ni.

The prepared parent alloy was put in a vessel, and subjected to dry-ball milling to obtain a ground product having an appropriate particle size. The ground product was loaded into a graphite crucible in a melt spinner, and melted with stifling at a temperature of about 1300° C. to 1500° C. for about 5 minutes. The resulting melted product was cooled to room temperature at a rate of about $10^5$ K/sec to prepare an alloy ribbon including Si and alloy phases.

The alloy ribbon was put into a vessel, and subjected to dry-ball milling using zirconia balls having a diameter of about 5 mm at a rotation speed of 100 rpm to obtain alloy powder having an average particle diameter (D50) of from about 3 µm to about 8 µm. In milling a ratio of the balls to the alloy powder was about 50:1 by weight. A total volume of the ball and the alloy ribbon put in the vessel for milling was half of the vessel.

The alloy powder was thermally treated in a $H_2/N_2$ gas atmosphere in a ratio of 2.8:97.2 by volume % at a temperature of about 500° C. for about 1 hour to prepare an anode active material.

Example 2

An anode active material was prepared in the same manner as in Example 1, except that the temperature of the thermal treatment performed in a $H_2/N_2$ gas atmosphere in a ratio of 2.8:97.2 volume % for about 1 hour was changed from about 500° C. to about 700° C.

Example 3

Si, Ti, and Ni were mixed together in a ratio of 66:17:17 by atomic % (at %) to obtain a mixture, which was then melted in an induction melting furnace in a vacuum to prepare a patent alloy of Si, Ti, and Ni.

The prepared parent alloy was put in a vessel, and subjected to dry-ball milling to obtain a ground product having an appropriate particle size. The ground product was loaded into a graphite crucible in a melt spinner, and melted with stifling at a temperature of about 1300° C. to 1500° C. for about 5 minutes. The resulting melted product was cooled to room temperature at a rate of about $10^5$ K/sec to prepare an alloy ribbon including Si and alloy phases.

The alloy ribbon was put into a vessel, and subjected to dry-ball milling using zirconia balls having a diameter of about 5 mm at a rotation speed of 100 rpm to obtain alloy powder having an average particle diameter (D50) of from about 3 μm to about 8 μm. In milling a ratio of the balls to the alloy powder was about 50:1 by weight. A total volume of the ball and the alloy ribbon put in the vessel for milling was half of the vessel.

The alloy powder was thermally treated in a $H_2/N_2$ gas atmosphere in a ratio of 2.8:97.2 by volume % at a temperature of about 500° C. for about 1 hour to prepare an anode active material.

Example 4

Si, Ti, and Ni were mixed together in a ratio of 66:17:17 by atomic % (at %) to obtain a mixture, which was then melted in an induction melting furnace in a vacuum to prepare a patent alloy of Si, Ti, and Ni.

The prepared parent alloy was put in a vessel, and subjected to dry-ball milling to obtain a ground product having an appropriate particle size. The ground product was loaded into a graphite crucible in a melt spinner, and melted with stifling at a temperature of about 1300° C. to 1500° C. for about 5 minutes. The resulting melted product was cooled to room temperature at a rate of about $10^5$ K/sec to prepare an alloy ribbon including Si and alloy phases.

The alloy ribbon was put into a vessel, and subjected to dry-ball milling using zirconia balls having a diameter of about 5 mm at a rotation speed of 100 rpm to obtain alloy powder having an average particle diameter (D50) of from about 3 μm to about 8 μm. In milling a ratio of the balls to the alloy powder was about 50:1 by weight. A total volume of the ball and the alloy ribbon put in the vessel for milling was half of the vessel.

The alloy powder was thermally treated in a $H_2/N_2$ gas atmosphere in a ratio of 2.8:97.2 by volume % at a temperature of about 700° C. for about 1 hour to prepare an anode active material.

Example 5

Si, Ti, and Ni were mixed together in a ratio of 66:17:17 by atomic % (at %) to obtain a mixture, which was then melted in an induction melting furnace in a vacuum to prepare a patent alloy of Si, Ti, and Ni.

The prepared parent alloy was put in a vessel, and subjected to dry-ball milling to obtain a ground product having an appropriate particle size. The ground product was loaded into a graphite crucible in a melt spinner, and melted with stifling at a temperature of about 1300° C. to 1500° C. for about 5 minutes. The resulting melted product was cooled to room temperature at a rate of about $10^5$ K/sec to prepare an alloy ribbon including Si and alloy phases.

The alloy ribbon was put into a vessel, and subjected to dry-ball milling using zirconia balls having a diameter of about 5 mm at a rotation speed of 100 rpm to obtain alloy powder having an average particle diameter (D50) of from about 3 μm to about 8 μm. In milling a ratio of the balls to the alloy powder was about 50:1 by weight. A total volume of the ball and the alloy ribbon put in the vessel for milling was half of the vessel.

The alloy powder was thermally treated in a $H_2/N_2$ gas atmosphere in a ratio of 2.8:97.2 by volume % at a temperature of about 700° C. for about 10 hour to prepare an anode active material.

Comparative Example 1

Si, Ti, and Ni were mixed together in a ratio of 65:17.5:17.5 by atomic % (at %) to obtain a mixture, which was then melted in an induction melting furnace in a vacuum to prepare a patent alloy of Si, Ti, and Ni.

The prepared parent alloy was put in a vessel, and subjected to dry-ball milling to obtain a ground product having an appropriate particle size. The ground product was loaded into a graphite crucible in a melt spinner, and melted with stifling at a temperature of about 1300° C. to 1500° C. for about 5 minutes. The resulting melted product was cooled to room temperature at a rate of about $10^5$ K/sec to prepare an alloy ribbon including Si and alloy phases.

The alloy ribbon was put into a vessel, and subjected to dry-ball milling using zirconia balls having a diameter of about 5 mm at a rotation speed of 100 rpm to prepare an anode active material as alloy powder having an average particle diameter (D50) of from about 3 μm to about 8 μm. In milling a ratio of the balls to the alloy powder was about 50:1 by weight. A total volume of the ball and the alloy ribbon put in the vessel for milling was half of the vessel.

Comparative Example 2

Si, Ti, and Ni were mixed together in a ratio of 66:17:17 by atomic % (at %) to obtain a mixture, which was then melted in an induction melting furnace in a vacuum to prepare a patent alloy of Si, Ti, and Ni.

The prepared parent alloy was put in a vessel, and subjected to dry-ball milling to obtain a ground product having an appropriate particle size. The ground product was loaded into a graphite crucible in a melt spinner, and melted with stifling at a temperature of about 1300° C. to 1500° C. for about 5 minutes. The resulting melted product was cooled to room temperature at a rate of about $10^5$ K/sec to prepare an alloy ribbon including Si and alloy phases.

The alloy ribbon was put into a vessel, and subjected to dry-ball milling using zirconia balls having a diameter of about 5 mm at a rotation speed of 100 rpm to obtain alloy powder having an average particle diameter (D50) of from about 3 μm to about 8 μm. In milling a ratio of the balls to the alloy powder was about 50:1 by weight. A total volume of the ball and the alloy ribbon put in the vessel for milling was half of the vessel.

The alloy powder was thermally treated in a $H_2/N_2$ gas atmosphere in a ratio of 2.8:97.2 by volume % at a temperature of about 800° C. for about 2 hour to prepare an anode active material.

Manufacture of Coin Half-Cells

Example 6

The anode active material of Example 1, polyamide imide, and ketjen black were mixed in a ratio of 90:8:2 together with deionized (DI) water, and mechanically stirred to prepare an anode active material slurry. The anode active material slurry was coated on a copper current collector having a thickness of about 10 μm using a doctor blade, and dried at about 350° C. in a vacuum for about 1 hour to form an anode active material layer having a thickness of about 30 μm on the 10 μm-thick copper current collector, followed by punching to form a circular anode having a diameter of about 16 mm.

A coin half-cell was manufactured using the anode, a lithium counter electrode, a microporous polyethylene separator (Star20, available from Asahi), and an electrolyte containing ethylene carbonate (EC), diethylene carbonate (DEC), and fluoroethylene carbonate (FEC) in a volume ratio of 5:70:25 in a glove box filled with helium.

Examples 7-10

Coin half-cells were manufactured in the same manner as in Example 6, except that the anode active materials of Examples 2 to 5, instead of the anode active material of Example 1, were used, respectively

Comparative Examples 3-4

Coin half-cells were manufactured in the same manner as in Example?6, except that the anode active materials of Comparative Examples 1-2, instead of the anode active material of Example 1, were used, respectively

Manufacture of 2032 Type Coin Full-Cells

Example 11

The anode active material of Example 1, polyamide imide, and ketjen black were mixed in a ratio of 90:8:2 together with deionized (DI) water, and mechanically stirred to prepare an anode active material slurry. The anode active material slurry was coated on a copper current collector having a thickness of about 10 fall using a doctor blade, and dried at about 350° C. in a vacuum for about 1 hour to form an anode.

A 2032 type coin full-cell having a capacity of about 4.5 mAh was manufactured using the anode and a cathode (available from Samsung SDI) consisting of $Li(Ni_{0.56}Co_{0.22}Mn_{0.22})O_2$. In manufacturing the coin full-cell, an electrolyte containing ethylene carbonate (EC), diethylene carbonate (DEC), and fluoroethylene carbonate (FEC) mixed in a volume ratio of 5:70:25 was used.

Examples 12-15

2032 type coin full-cells were manufactured in the same manner as in Example 11, except that the anode active materials of Examples 2 to 5, instead of the anode active material of Example 1, were used, respectively

Comparative Examples 5-6

2032 type coin full-cells were manufactured in the same manner as in Example 11, except that the anode active materials of Comparative Examples 1 to 2, instead of the anode active material of Example 1, were used, respectively

Evaluation Example 1

X-Ray Diffraction (XRD) Test

Ratio of Peak Intensities

X-ray diffraction (XRD) test of the anode active materials of Examples 1-5 and Comparative Example 1 was performed using an XRD system (PANalytical X'pert PRO MPD). The results are shown in FIG. 1 and Table 1 below. The XRD test was conducted at a CuK-α X-ray wavelength of 1.541 Å

A peak of Si(111) plane of Si phases was observed at a Bragg angle 2θ of 28.5°±0.1°, and a peak of Si(220) plane was observed at a Bragg angle 2θ of 47.5°±0.1°. A primary peak of $Si_7Ti_4Ni_4$ phase of the alloy phases was observed at a Bragg angle 2θ of 43.1°±0.1°, and a secondary peak thereof was observed at a Bragg angle 2θ of 40.5°±0.1°.

TABLE 1

| Example | Peak intensity ratio $(I_{(111)}/I_{(220)})$ of Si(111) plane to Si(220) plane | Primary to secondary peak intensity ratio $(I_{(mainpeak)}/I_{(minor\ peak)})$ of $Si_7Ti_4Ni_4$ phase at Bragg angle 2θ in XRD spectrum |
|---|---|---|
| Example 1 | 1.185 | 1.156 |
| Example 2 | 1.495 | 1.733 |
| Example 3 | 1.155 | 1.105 |
| Example 4 | 1.196 | 2.091 |
| Example 5 | 1.374 | 2.344 |
| Comparative Example 1 | 0.979 | 0.964 |

Referring to Table 1 and FIG. 1, the anode active materials of Examples 1 to 5 were found to have a peak intensity ratio $(I_{(111)}/I_{(220)})$ of Si(111) to Si(220) plane of from about 1.1 to 1.5, while the anode active material of Comparative Example 1 had a ratio of $I_{(111)}/I_{(220)}$ of less than 1.0.

$Si_7Ti_4Ni_4T$ phases in the anode active materials of Examples 1 to 5 were found to have a primary to secondary peak intensity ratio $I_{(primary\ peak)}/I_{(secondary\ peak)}$ of about 1.1 or greater at Bragg angles 2θ in XRD spectra, while $Si_7Ti_4Ni_4$ phase in the anode active material of Comparative Example 1 had a ratio of $I_{(primary\ peak)}/I_{(secondary\ peak)}$ of less than 1.0.

Particle Diameter of Si Crystals

Based on the results of the XRD test, a full width at half maximum (FWHM) was calculated from the peak of the Si(111) observed in each of the anode active materials of Examples 1 to 5 and Comparative Example 1. A particle diameter of Si crystals in each anode active material was calculated using the FWHM, according to Scherrer's equation represented by Equation 1 below. The results are shown in Table 2 below.

$$t = K\lambda/\beta \cos\theta \qquad \text{<Equation 1>}$$

In Equation 1, K is a shape factor of 0.9, λ is a X-ray wavelength of 1.5406 Å, β is a FWHM, and θ is a Bragg angle of 14.25°.

TABLE 2

| Example | FWHM (°) | Si crystal particle diameter (nm) |
|---|---|---|
| Example 1 | 0.2586 | 31.697 |
| Example 2 | 0.2282 | 35.916 |
| Example 3 | 0.2491 | 32.904 |
| Example 4 | 0.2406 | 34.070 |

TABLE 2-continued

| Example | FWHM (°) | Si crystal particle diameter (nm) |
|---|---|---|
| Example 5 | 0.2137 | 38.358 |
| Comparative Example 1 | 0.31 | 26.441 |

Referring to Table 2, the anode active materials of Examples 1 to 5 were found to have a particle diameter of Si crystals of from about 31 nm to about 39 nm. The anode active material of Comparative Example 1 was found to have a particle diameter of Si crystals of less than 30 nm.

Evaluation Example 2

Particle Size Distribution Measurement of Anode Active Material

About 01.1 g of the alloy powder of Example 4 was put in a 20 ml-vial, which was then filled up with distilled water, followed by measuring particle size distribution using a particle size analyzer (LS 13 320 model, available from Hitachi).

Prior to the particle size distribution measurement, the alloy powder of Example 4 was dispersed in distilled water in the vial for about 1 minute using a sonicator. The results are shown in FIG. 2.

Figure 2:
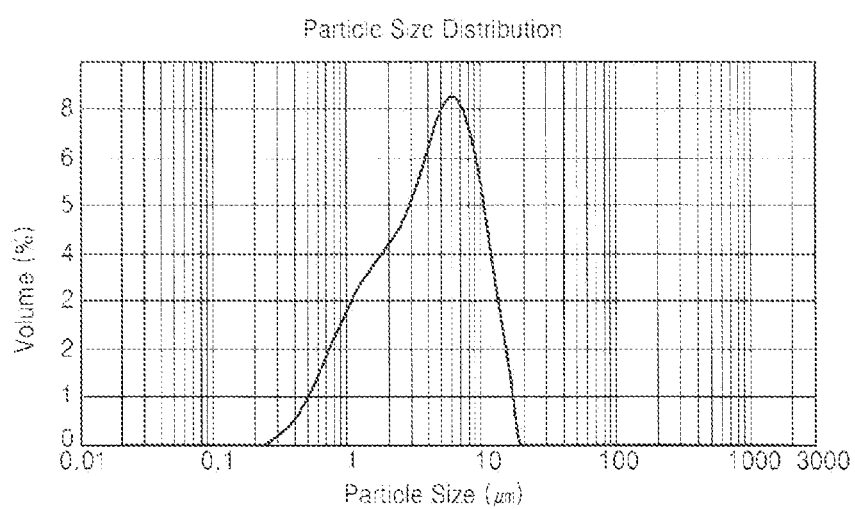
FIG. 2 is a graph of particle size distribution of the anode active material of Example 4.

Referring to FIG. 2, the alloy powder of example 4 as an anode active material was found to have an average particle diameter (D50) of from about 3 µm to about 8 µm.

Evaluation Example 3

Evaluation of Cell Performance

Initial Efficiency and Discharge Capacity

Figure 4:
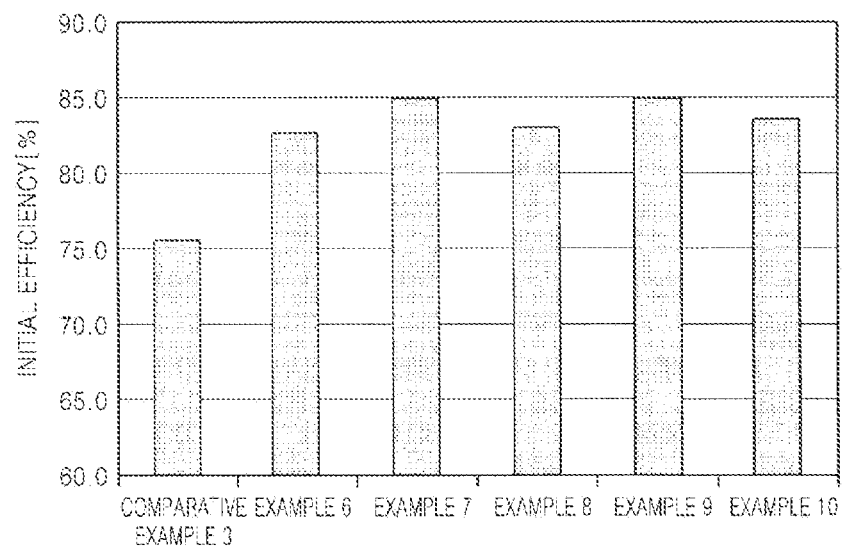
FIG. 4 is a graph of initial efficiencies of coin half-cells of Examples 6 to 10 and Comparative Example 3.
Figure 5:
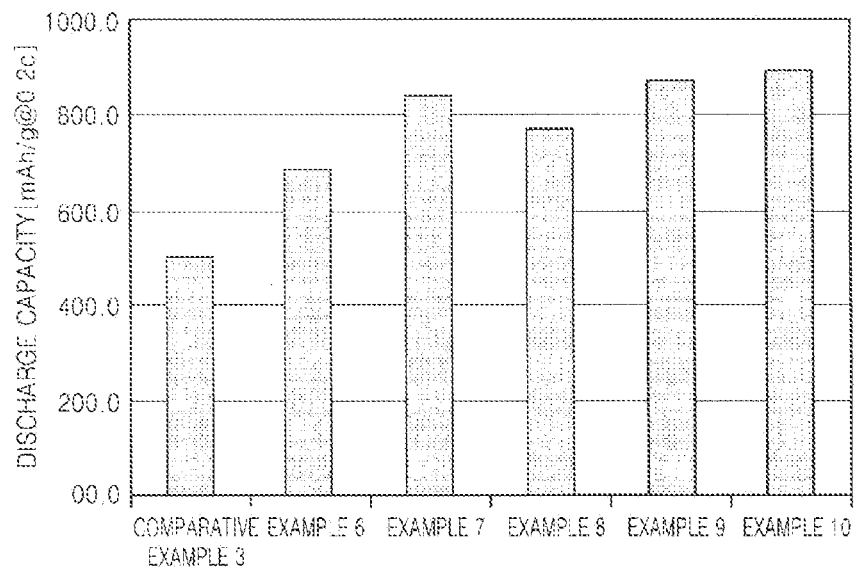
FIG. 5 is a graph of 0.2C-discharge capacities of the coin half-cells of Examples 6 to 10 and Comparative Example 3.

Characteristics of the coin half-cells of Examples 6 to 10 and Comparative Example 3 were evaluated in the following charge/discharge conditions. As a result, initial efficiencies and 0.2C-discharge capacity are shown in FIGS. 4 and 5 and Table 3 below.

In this regard, the term "0.2C-discharge capacity" refers a discharge capacity at a current rate at which the capacity in mAh of a cell is fully dischargeable for 5 hours.

The charge/discharge conditions were as follows. For an initial charge/discharge test, each of the coin half-cells of Examples 6-10 and Comparative Examples 3 was charged at a constant current of 0.1C to a final charge voltage (cut-off voltage) of 10 mV(Li/Li$^+$), charged at a constant voltage to a final charge current (cut-off current) of 0.01C, and then discharged at a constant current to a final discharge voltage of 1.5V(Li/Li$^+$). After the initial charge/discharge test, each of the coin half-cells of Examples 6-10 and Comparative Examples 3 was charged at a constant current of 0.2C to a final charge voltage of 10 mV(Li/Li$^+$), charged at a constant voltage to a final charge current of 0.01C, and then discharged at a constant current to a final discharge voltage of 1.5V(Li/Li$^+$).

TABLE 3

| Example | Initial efficiency (%) | 0.2 C-Discharge capacity (mAh/g) |
|---|---|---|
| Example 6 | 82.8 | 681.6 |
| Example 7 | 85.0 | 841.6 |
| Example 8 | 83.0 | 772.0 |
| Example 9 | 85.1 | 875.9 |
| Example 10 | 83.6 | 895.4 |
| Comparative Example 3 | 75.6 | 504.5 |

Referring to Table 3 and FIG. 4, the coin half-cells of Examples 6 to 10 were found to be higher in initial efficiency and 0.2C-discharge capacity than the coin half-cell of Comparative Example 3.

Capacity Retention Rate [%]

Figure 6:
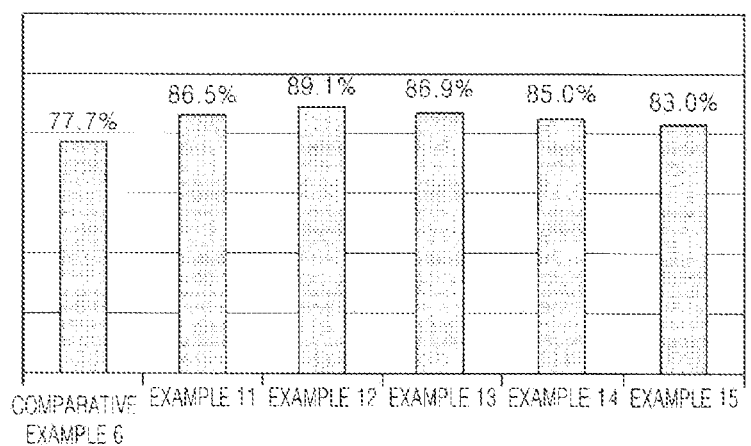
FIG. 6 is a graph of capacity retention rates of 2032 type coin full-cells of Examples 11-15 and Comparative Example 6.
Figure 7:
FIG. 7 shows a method of preparing an anode active material of the present invention.
Figure 7:
Figure 7:

Charge/discharge test of the 2032 type coin full-cells of Examples 11 to 15 and Comparative Example 6 was conducted in the following charge/discharge conditions to obtain capacity retention rates. The results are shown in FIG. 6 and Table 4.

The charge/discharge test conditions were as follows. After one cycle of formation charging and discharging, each of the cells was charged at a constant current of 0.2C to a voltage of 4.2V, charged at a constant voltage of 4.2V to a current of 0.01C, and then discharged at 0.2C to a voltage of 2.75 V. These charging and discharging conditions were termed as "standard charging and discharging conditions", and the discharge capacity in these conditions was defined as a "standard capacity". The measured standard capacities of the cells ranged from about 3.8 mAh to about 4.2 mAh.

Afterward, each of the 2032 type coin full-cells was charged at a constant current of 1C to a voltage of 4.2V in a chamber at room temperature, and then charged at a constant voltage 0.2V to a current of 0.01C, followed by discharging at 1C to a voltage of 2.75V. Then, a discharge capacity (discharge capacity after the 1$^{st}$ cycle) was measured. Then, the charge-discharge cycle was repeated 50 times in the same charge/discharge conditions. A discharge capacity at each cycle was measured, and a capacity retention rate was calculated using the measured discharge capacities according to Equation 1 below:

Capacity retention rate [%]=[Discharge capacity at 50$^{th}$ cycle/Discharge capacity at 1$^{st}$ cycle]×100  <Equation 1>

TABLE 4

| Example | Discharge capacity at 1$^{st}$ cycle (mAh) | Discharge capacity at 50$^{th}$ cycle (mAh) | Capacity retention rate (%) |
|---|---|---|---|
| Example 11 | 2.846 | 2.462 | 86.5 |
| Example 12 | 3.076 | 2.741 | 89.1 |
| Example 13 | 3.184 | 2.767 | 86.9 |
| Example 14 | 3.430 | 2.910 | 85.0 |
| Example 15 | 3.364 | 2.792 | 83.0 |
| Comparative Example 6 | 3.268 | 2.539 | 77.7 |

Referring to Table 4 and FIG. 6, the 2032 type coin full-cells of Examples 11-15 were found to have higher capacity retention rates than the 2032 type coin full-cell of Comparative Example 6.

As described above, according to the one or more of the above embodiments of the present invention, which provide an anode active material including an alloy containing silicon (Si), titanium (Ti) and nickel (Ni) elements, wherein the alloy includes a Si phase and an alloy phase, and a peak intensity ratio ($I_{(111)}/I_{(220)}$) of Si(111) to Si(220) plane in a X-ray diffraction spectrum of the Si phase is from about 1.0 to about 1.5; a lithium secondary battery including the anode active material, and a method of preparing the anode active material, the Si phase of the anode active material may be active as crystalline phase, and thus provide improved initial efficiency, discharge capacity and cycle characteristics of a lithium secondary battery.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. An anode active material comprising an alloy containing silicon (Si), titanium (Ti) and nickel (Ni),
wherein the alloy includes a Si phase and an alloy phase, and a peak intensity ratio ($I_{(111)}/I_{(220)}$) of Si(111) to Si(220) plane peaks in an X-ray diffraction spectrum of the Si phase is from about 1.0 to about 1.5.

2. The anode active material of claim 1, wherein the peak intensity ratio ($I_{(111)}/I_{(220)}$) of Si(111) to Si(220) plane peaks in the X-ray diffraction spectrum of the Si phase is from about 1.1 to about 1.5.

3. The anode active material of claim 1, wherein the Si phase includes Si crystal particles, and the Si crystal particles have a particle diameter of from about 30 nm to about 40 nm.

4. The anode active material of claim 1, wherein the alloy phase comprises a $NiSi_2$ phase or a $Si_7Ti_4Ni_4$ phase.

5. The anode active material of claim 4, wherein the $Si_7Ti_4Ni_4$ phase forms a matrix.

6. The anode active material of claim 1, wherein an X-ray diffraction spectrum of the $Si_7Ti_4Ni_4$ phase at a CuK-α X-ray wavelength of 1.541 Å includes a primary peak at a Bragg angle 2θ of about 43.1°±0.1°, and a secondary peak at a Bragg angle 2θ of about 40.5°±0.1°.

7. The anode active material of claim 6, wherein a primary to secondary peak intensity ratio $I_{(primary\,peak)}/I_{(secondary\,peak)}$ of the $Si_7Ti_4N_4$ phase at the Bragg angles 2θ in the X-ray diffraction spectrum is about 1.1 or greater.

8. The anode active material of claim 1, wherein the alloy has a composition represented by Formula 1 below:

$$Si_x\text{—}Ti_y\text{—}Ni_z \qquad \text{<Formula 1>}$$

wherein, in Formula 1, x/(x+y+z) is from about 0.5 to about 0.8; y/(x+y+z) is from about 0.1 to about 0.25; and z/(x+y+z) is from about 0.1 to about 0.25.

9. The anode active material of claim 1, wherein the Si content in the alloy is from about 50 to about 80 atomic %.

10. The anode active material of claim 1, wherein the Ti content in the alloy is from about 10 to about 25 atomic %, and the Ni content is from about 10 to about 25 atomic %.

11. The anode active material of claim 1, wherein the alloy is in powder form having an average particle diameter (D50) of from about 1 μm to about 10 μm.

12. The anode active material of claim 1, wherein the anode active material further comprises a carbonaceous material.

13. A lithium secondary battery comprising:
a cathode;
an anode including the anode active material of claim 1; and
an electrolyte disposed between the cathode and the anode.

* * * * *